United States Patent [19]

Tefertiller et al.

[11] 4,343,919

[45] Aug. 10, 1982

[54] ADDITION POLYMERIZABLE POLYETHYLENIC POLYMERS HAVING PENDANT ACRYLOYL URETHANE GROUPS

[75] Inventors: Nancy B. Tefertiller; Robert F. Harris, both of Midland, Mich.

[73] Assignee: The Dow Chemical Company, Midland, Mich.

[21] Appl. No.: 128,422

[22] Filed: Mar. 10, 1980

[51] Int. Cl.$^3$ ............................................ C08F 120/36
[52] U.S. Cl. ................... 525/278; 204/159.14; 204/159.16; 204/159.18; 428/425.1; 428/425.8; 526/301
[58] Field of Search .................. 526/301; 525/278; 204/159.14, 159.16, 159.18

[56] References Cited

U.S. PATENT DOCUMENTS

| | | | |
|---|---|---|---|
| 3,632,796 | 1/1972 | Holicky et al. | 525/278 |
| 3,658,670 | 4/1972 | Holicky et al. | 204/159 |
| 3,694,415 | 9/1972 | Honda et al. | 525/278 |
| 4,173,682 | 11/1979 | Noomen et al. | 428/423 |
| 4,192,762 | 3/1980 | Osborn | 526/301 |

*Primary Examiner*—Harry Wong, Jr.
*Attorney, Agent, or Firm*—Jeffrey S. Boone

[57] ABSTRACT

Addition polymerizable polymers having a polyethylenic backbone with pendant acryloyl urethane groups are usefully employed as flooring materials and in other applications utilizing radiation curable or chemically curable materials. Such polymers are advantageously prepared by reacting a polymer of an isocyanatoalkyl ester of an $\alpha,\beta$-ethylenically unsaturated carboxylic acid, e.g., 2-isocyanatoethyl methacrylate with an active hydrogen-substituted alkyl ester of acrylic acid, e.g., hydroxyethyl acrylate.

8 Claims, No Drawings

ADDITION POLYMERIZABLE POLYETHYLENIC POLYMERS HAVING PENDANT ACRYLOYL URETHANE GROUPS

BACKGROUND OF THE INVENTION

This invention relates to polymers having polyethylenic backbones with pendant ethylenically unsaturated groups that undergo addition polymerization upon exposure to suitably active radiation and/or chemical initiation.

The use of organic polymers in coating compositions for application on a wide variety of substrates such as floor materials, appliance housings, paper products, etc., is well known. Characteristically, such polymers are often either thermoplastic or thermosettable. For many coating applications, the thermoplastic polymers do not exhibit the necessary resistance to abrasion and organic solvents. Unfortunately, the heat curable, thermosettable polymers are usefully applied only to substrates that can tolerate the temperatures often required to cure such polymers. In addition, thermal curing processes are often too time consuming to be economical in many applications.

Thus, it has been desirable to develop polymers which cure by non-thermal means such as by moisture cure or radiation cure techniques. Moisture curable polymers are often unsatisfactory because of the restrictions of temperature and relative humidity necessary to achieve a crosslinked coating. Also, the time period required to achieve complete cure (two to three weeks) is often impractical.

Polymers, which upon exposure to light or comparable radiation source crosslink to form insoluble materials, exhibit the most desirable properties in that they generally are cured rapidly and can be applied to heat sensitive substrates. Accordingly, such radiation curable polymers are often useful in coating applications as varnishes and inks as well as finish coats on flooring and other items such as counter tops. Such applications usually require that the resulting insoluble, crosslinked coating be non-yellowing, abrasion resistant and stain resistant.

Unfortunately, many of the conventional radiation curable polymers, such as epoxy acrylates, now being employed in conventional, UV curable varnish and ink formulations are particularly sensitive to light, especially sunlight, in that they yellow and craze after relatively brief periods of exposure. Other conventional radiation curable compositions contain very toxic substances such as monomeric or unreacted isocyanate, hydroxyalkyl esters of acrylic acid and the like. Examples of conventional radiation curable and photo curable polymeric materials are described in U.S. Pat. Nos. 3,928,299 and 3,924,033.

In view of the aforementioned deficiencies of conventional radiation curable polymeric compositions, it is highly desirable to provide a relatively nontoxic substance which crosslinks readily and quickly upon exposure to low doses of relatively low energy radiation and/or chemical initiation to form a crosslinked coating exhibiting long-term toughness, abrasion resistance and stain resistance.

SUMMARY OF THE INVENTION

In one aspect of the present invention is an addition polymerizable polymer comprising a polyethylenic backbone having at least one pendant acryloyl urethane group which reacts upon exposure to (1) suitably active radiation, hereinafter called actinic radiation, and/or (2) chemical initiation. The polyethylenic backbone is advantageously a hydrocarbon chain which results from the addition polymerization of ethylenically unsaturated monomers. The acryloyl urethane group is more specifically characterized by the formula:

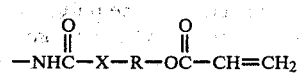

wherein R is alkylene and X is —O—, —S— or

and $R_1$ is hydrogen or alkyl. Hereinafter, this polymer having at least one pendant acryloyl urethane group shall be referred to as a urethane polythene.

In another aspect, the present invention is a method for coating substrates such as floors, wood panels, paper, plastic sheets or sheet metal with a coating composition comprising the aforementioned urethane polythene and subsequently crosslinking said polymer, by exposure to radiation, or chemical initiation, to form a relatively hard, tough, abrasion and chemical resistant coating which adheres to the substrate.

In yet another aspect, the present invention is an addition polymerizable composition comprising the aforementioned urethane polythene and at least one addition polymerizable monomer which is copolymerizable therewith.

In addition to the advantageous use of the urethane polythene in coating applications, such polymers are also useful in ink and varnish formulations and in other conventional compositions requiring a radiation curable polymer. These urethane polythenes are also useful in compositions employing other means of free radical polymerization such as chemical free-radical generators, e.g., peroxygen and azo compounds. In such compositions, these addition polymerizable urethane polythenes may be copolymerized with other addition polymerizable monomers such as styrene, acrylonitrile, butadiene, ethyl acrylate and the like. These compositions and the resulting copolymers are useful in the manufacture of foams, elastomers, moldings and the like.

DETAILED DESCRIPTION OF THE PREFERRED EMBODIMENTS

The curable urethane polythenes of this invention are advantageously those represented by the formula:

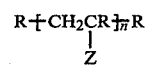

wherein each R is individually hydrogen, alkyl, or a residue of an initiator or chain termination agent for an addition polymer; each Z is individually an oxycarbonylamino aliphatic hydrocarbyl ester of acrylic acid, isocyanato, isocyanato alkyl oxycarbonyl, nitrile, carbonyloxy hydrocarbyl, hydrocarbyl, hydrogen, halohydrocarbyl, carboxyl, oxycarbonyl hydrocarbyl, or carboxamide; provided at least one Z is said oxycarbonylamino ester; n is a whole number such that the polymer has a number average molecular weight ($M_n$)

in the range from about 1,000 to about 100,000, preferably 2,000 to 20,000. For the purposes of this invention, hydrocarbyl is a monovalent hydrocarbon moiety such as aryl, alkyl, alkenyl and the like. Also, the terminology "each R is individually" means that the R groups in a particular polymer molecule may be the same or different. A corresponding interpretation applies to the terminology "each Z is individually."

The more preferred urethane polythenes of the present invention have polyethylenic backbones bearing at least one pendant ethylenically unsaturated urethane group represented by the formula:

wherein each R' is independently hydrogen, alkyl or a comparable inert substituent; and m is a whole number preferably 1 to 6, more preferably 2 to 4, and most preferably 2.

The urethane polythenes of the present invention are most advantageously prepared by (1) polymerizing an isocyanatoalkyl ester of an $\alpha,\beta$-ethylenically unsaturated carboxylic acid singularly or in combination with other ethylenically unsaturated monomer(s) under conditions sufficient to cause the addition polymerization of the ethylenically unsaturated groups and (2) reacting the isocyanato group(s) pendant to the polyethylenic backbone with an active hydrogen compound containing an acryloyl group.

Addition polymerization of the monomer(s) to form the polythene precursor is initiated by using conventional free radical generating compounds such as peroxygen compounds, e.g., peroxides, persulfates, percarbonates and perborates, as well as azo compounds. Generally, such initiators are employed in amounts effective to cause polymerization, e.g., from about 0.1 to about 10 weight percent based on monomer weight.

In addition to the foregoing initiators, chain transfer agents such as mercaptans, e.g., dodecyl thiol, and carbon tetrahalides such as carbon tetrachloride may be employed in conventional amounts to control molecular weight of the polythene precursor. The polymerization is readily carried out by simultaneously combining at a steady or constant rate a monomer(s) and a free radical catalyst under conditions sufficient to cause free radical addition polymerization. The temperature of the polymerization is dependent upon initiator and is preferably in the range from about 25° to about 190° C., most preferably from about 110° to about 130° C. when azobisisobutyronitrile is employed as the catalyst. Alternatively, the free radical catalyst may be dispersed in a portion of the monomer and/or solvent and thereafter added along with the monomer to the remaining portion of the monomer and/or solvent. Other polymerization processes, both continuous and batch, may be suitably employed.

For the purposes of this invention, the isocyanate monomer used to prepare the polythene precursor is a monomer having an isocyanate group and an ethylenically unsaturated group capable of undergoing free radical initiated addition polymerization as readily as an acryloyl or a vinylbenzyl moiety. Representative isocyanates are the isocyanato alkyl esters of $\alpha,\beta$-ethylenically unsaturated carboxylic acids, monovinylidene aryl isocyanates and monovinylidene arylmethyl isocyanates, with the isocyanatoalkyl esters being preferred.

Exemplary isocyanatoalkyl esters include 2-isocyanatoethyl methacrylate, 2-isocyanatoethyl acrylate, 3-isocyanatopropyl methacrylate, 1-methyl-2-isocyanatoethyl methacrylate and 1,1-dimethyl-2-isocyanatoethyl acrylate with 2-isocyanatoethyl methacrylate being most preferred. Suitable methods of preparing said isocyanato esters are well known, e.g., as shown in U.S. Pat. Nos. 2,718,516 and 2,821,544 and British Pat. No. 1,252,099. Exemplary monovinylidene aromatic isocyanates and monovinylidene arylmethyl isocyanates include styrene isocyanate and vinylbenzyl isocyanate.

Suitable ethylenically unsaturated monomers (so-called other monomers or other ethylenically unsaturated monomers) which may be copolymerized with the isocyanate monomer to form the polythene precursor include aliphatic conjugated dienes such as butadiene and isoprene; monovinylidene aromatic monomers such as styrene, $\alpha$-methyl styrene, ar-methyl styrene, ar-(t-butyl)styrene, ar-chlorostyrene, ar-cyanostyrene and ar-bromostyrene; alkyl esters of $\alpha,\beta$-ethylenically unsaturated carboxylic acids such as methyl methacrylate, ethyl acrylate, butyl acrylate, and the like; $\alpha,\beta$-ethylenically unsaturated nitriles, anhydrides and amides such as acrylonitrile, methacrylonitrile, maleic anhydride, acrylamide, methacrylamide, N,N-dimethyl acrylamide, N-(dimethylaminomethyl) acrylamide, and the like; vinyl esters such as vinyl acetate; vinyl ethers; vinyl ketones; vinyl and vinylidene halides as well as a wide variety of other ethylenically unsaturated materials which are copolymerizable with the aforementioned isocyanate monomers, but which are inert to the isocyanate groups of said isocyanate monomers. It is understood that mixtures of two or more of the aforementioned monomers are also suitably employed in making the copolymer. Of the foregoing monomers, the monovinylidene aromatic monomers, particularly styrene, and the alkyl esters of $\alpha,\beta$-ethylenically unsaturated carboxylic acids, particularly butyl acrylate and methyl methacrylate are especially preferred.

In the polythene precursor, the relative proportions of isocyanate monomer(s) to other monomer(s), if any other monomer is employed, is not particularly critical so long as each molecule of polythene precursor contains at least one isocyanate group, preferably at least two isocyanate groups. Preferred polymerization recipes for the polythene precursor contain from about 5 to about 100, most preferably from about 10 to about 50, mole percent of isocyanate monomer(s) and from about 0 to about 95, most preferably from about 50 to about 90, mole percent of other monomer(s), based on total monomers. Especially preferred polymerization recipes contain from about 10 to about 30 mole percent of isocyanato alkyl acrylate or methacrylate such as 2-isocyanatoethyl methacrylate, from about 0 to about 30 mole percent of monovinylidene aromatic such as styrene and from about 40 to about 90 mole percent of alkyl acrylate(s) and/or methacrylate(s) such as butyl acrylate and methyl methacrylate.

The reaction of the polythene precursor and active hydrogen acryloyl compound (hereinafter called urethane reaction) is carried out in the presence of a urethane catalyst such as amine or an organometallic catalyst, preferably an organometallic catalyst such as stannous octoate or dibutyltin dilaurate. The conditions employed in carrying out the urethane reaction involve maintaining the reaction mixture (1) of the polythene precursor and (2) the active hydrogen acryloyl compound, preferably neat, or alternatively dissolved in a nonreactive solvent such as ethyl acetate, toluene or cellosolve acetate at a temperature from ambient to 140° C. in a vessel for a reaction time from about 1 to about 24 hours. The amount of the isocyanate groups of the polythene precursor are preferably stoichiometric or slightly in excess of the active hydrogen groups of the active hydrogen compound. It is suitable, but less preferred, to employ an excess of active hydrogen groups to isocyanate groups.

The active hydrogen acryloyl compound (hereinafter called AH monomer) is one containing an acryloyl group

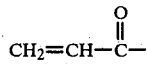

and an active hydrogen moiety. For the purposes of this invention, an active hydrogen moiety refers to a moiety containing a hydrogen atom which, because of its position in the molecule, displays significant activity according to the Zerewitnoff test described by Woller in the *Journal of American Chemical Society*, Vol. 49, page 3181 (1927). Illustrative of such active hydrogen moieties are —COOH, —OH, —NH$_2$, —NH—, —CONH$_2$, —SH and —CONH—. Exemplary AH monomers include aminohydrocarbyl and hydroxyhydrocarbyl esters of acrylic acid such as hydroxyethyl acrylate, hydroxypropyl acrylate, aminoethyl acrylate and other hydroxyalkyl or aminoalkyl acrylates, acrylamide, and other ethylenically unsaturated acrylamides including N-substituted amides such as N-(methyl)acrylamide, N-(methylol)acrylamide and N-(aminomethyl)acrylamide; acrylic acid; and mercaptoalkyl esters of acrylic acid such as mercaptoethyl acrylate. Of the foregoing AH monomers, the hydroxyalkyl acrylates such as hydroxyethyl acrylate are preferred.

The resulting polythene having pendant acryloyl urethane groups is generally used without further purification. If a solvent has been used in the reaction, it can be removed, or the composition containing the solvent can be employed as is.

In preparing a photocurable coating formulation in accordance with the present invention, the aforementioned urethane polythene is combined with an initiator effective to initiate crosslinking of the polymer on exposure to radiation, hereinafter referred to as a photoinitiator. For this purpose, the photoinitiator is advantageously dithiocarbamates, dithiocarbonates, thiuram compounds, thiazoles and xanthates, as well as α-phenyl acetophenone derivatives such as benzil, benzoin and the benzoin ethers, e.g., benzoin-methyl, -ethyl, -n-propyl and -isopropyl ethers. While the amount and type of photoinitiator employed will vary with the intensity and dosage of radiant energy to be employed, the aforementioned photoinitiators are usually employed in amounts from about 0.5 to about 8, preferably from about 1 to about 3, weight percent based on the weight of the coating formulation. Of the foregoing initiators, the benzoin ethers are preferred.

In preparing chemically initiated polymer products using the urethane polythene of the present invention, conventional free radical generating compounds as defined hereinbefore are employed to initiate addition polymerization of the urethane polythene or to initiate copolymerization of the urethane polythene with one or more other ethylenically unsaturated copolymerizable monomers, as exemplified hereinbefore. Typically, such initiators are employed in amounts effective to cause polymerization, e.g., from about 0.1% to about 10% based on the weight of polymerizable material, e.g., urethane polythene and other monomer(s).

A nonreactive solvent and/or copolymerizable monomer is often employed in the coating formulation in order to reduce viscosity of the formulation and/or to impart additional properties to the resulting crosslinked coating or article. Examples of suitable non-reactive solvents for the urethane polythene include volatile, relatively low viscosity liquid solvents such as aromatic hydrocarbons, e.g., benzene and toluene; esters, e.g., ethyl acetate and cellosolve acetate; chlorinated solvents such as perchloroethylene and 1,1,1-trichloroethane; and ethers such as dioxane, tetrahydrofuran as well as dimethoxydiethylene and other glymes. When used, the non-reactive solvents are normally employed in amounts sufficient to reduce the viscosity of the curable composition, usually from about 5 to about 80, preferably from about 5 to about 30, weight percent based on the combined weight of total curable composition and the solvent. Suitable copolymerizable monomers are monoethylenically and polyethylenically unsaturated monomers which undergo addition polymerization upon exposure to actinic radiation and/or chemical initiation. Examples of suitable copolymerizable monomers for this purpose include the monoethylenically unsaturated monomers exemplified hereinbefore; polyvinyl aromatics such as divinyl benzene; conjugated aliphatic dienes, e.g., butadiene; di- and triesters of α,β-ethylenically unsaturated carboxylic acid such as trimethylol propane triacrylate and hexanediol diacrylate and the like, including mixtures thereof. When used, the copolymerizable monomers are normally employed in amounts in the range from about 5 to about 75 weight percent based on the total weight of the curable composition, i.e., combined weight of the copolymerizable monomer and urethane polythene. In preparing a preferred radiation curable formulation, the amount of copolymerizable monomer normally employed is in the range of from 0 to about 30 weight percent based on the total weight of the curable composition.

In addition to the foregoing photoinitiators, nonreactive solvents and copolymerizable monomers, other additives such as impact modifiers (rubber polymers and elastomers), pigments and fillers, stabilizers, fire retardants, etc., can be employed.

The aforementioned coating formulations are readily cast, sprayed or otherwise applied as films or coatings by conventional coating techniques used by those skilled in the art. Typically, the thickness of the film or coating will vary from about 0.0025 to about 0.125 mm, with thicknesses in the range from about 0.010 to about 0.055 mm being preferred.

When radiation curing is to be employed, the coating of film is then exposed to sufficient actinic radiation to cure the coating or film to a material that is insoluble in aqueous or organic liquid media. For purposes of this invention, actinic radiation is any radiation which will cause the desired crosslinking reaction. Since the radiation curable composition contains acrylate moieties, the radiation curing step is readily carried out in atmosphere that contains oxygen.

Examples of actinic radiation advantageously employed include ultraviolet light; accelerated particulate (ionizing) radiation wherein particulates include electrons, protons, neutrons, etc.; X-rays; and the like, with ultraviolet light being preferred. In the case of ultraviolet light radiation, suitable intensity is supplied by mercury vapor lamps.

The following examples are given as illustrative embodiments of the invention and should not be construed as limiting its scope. In these examples, all parts and percentages are by weight unless otherwise indicated.

EXAMPLE 1

A. Preparation of Polythene Precursor

Into a 2-liter polymerization vessel equipped with an addition funnel, condenser and stirrer are added 41 parts of ethyl acrylate (EA), 41 parts of methyl methacrylate (MMA), 18 parts of 2-isocyanato ethyl methacrylate (IEM), 0.5 part of azobisisobutyronitrile (AZO) and 109 parts of toluene. The vessel is heated with stirring to 115° C. until polymerization is completed to form the desired polythene precursor.

B. Preparation of Urethane Polythene

Into a 250 ml round bottom flask fitted with an air-driven stirrer, a water condenser capped with a drying tube, an addition funnel and a thermocouple controlled heating lamp are placed 50.0 g (0.0277 mole of NCO) of the aforementioned polythene precursor, 0.0053 g of hydroquinone inhibitor and 2 drops of stannous octoate as catalyst. The contents of the flask are heated to 50° C. and 3.22 g (0.0277 mole) of 2-hydroxyethyl acrylate (HEA) are added dropwise over a period of 9 minutes with stirring and followed by the addition of 10 ml of toluene. Heating of the stirred reaction mixture at approximately 50° C. is continued for a period of 1.8 hours and an additional 0.35 g of HEA is added. Analysis of the resulting reaction product by an infrared spectrometer indicates no unreacted isocyanate remains in the reaction mixture. Upon formulating 70 parts of this reaction product (urethane polythene) with 30 parts of trimethylolpropane triacrylate, 4.5 parts of benzoin ether photoinitiator, casting a thin layer onto a metal panel and curing in air by exposing the coated panel to ultraviolet light, the formulation cures to a relatively hard coating (0.013 mm) which is insoluble in water or hydrocarbon solvents and exhibits excellent toughness and adhesion as reported in Table I.

EXAMPLE 2

Following the general procedure of Example 1, a terpolymer of EA (44.5%), MMA (44.5%) and IEM (11%) is prepared at 47 percent solids in toluene. To 50.18 g (0.0164 mole of NCO) of this polymer solution in a 250 ml flask is added with stirring 2.13 g of 97 percent 2-hydroxypropyl acrylate (HPA) (0.0164 mole) over a 7 minute period at ~25° C. Thereafter, one drop of stannous octoate catalyst is added to the reaction mixture and the reaction proceeds at ~25° C. for 21.2 hours. The temperature of the reaction mixture is increased to ~49° C. During the following 7 hour period, 0.717 g of HPA is added. The reaction temperature is maintained at 25° C. for an additional 18 hours after which time only a trace of NCO is detected by IR analysis thus indicating that the desired urethane polythene is formed.

A formulation consisting of 100 parts of the aforementioned urethane polythene and 3 parts of benzoin ether photoinitiator is cast onto a metal panel and cured in air by exposing the coated panel to UV radiation. The coating is tested for physical properties and the results are reported in Table I.

EXAMPLE 3

Following the procedure of Example 1, a copolymer (polythene precursor) consisting of 30 percent of styrene, 20 percent of butylacrylate, 20 percent of methyl methacrylate and 30 percent of IEM is prepared at 50.4 percent solids in 2-ethoxyethyl acetate with the copolymer containing 4.4 percent of NCO.

Following the procedure of Example 1, the resulting polythene precursor is converted to a urethane polythene by reacting it with hydroxyethyl acrylate.

A formulation consisting of 80 parts of the aforementioned urethane polythene, 20 parts of hexanediol diacrylate and ~3 parts of benzoin ether photoinitiator is cast onto a metal panel and heated at 180° F. for 10 min. The formulation is then cured in air by exposing the coated panel to UV radiation. The cured coating (~0.02 mm) is tested for physical properties and the results are reported in Table I.

Following the above procedure, a similar coating of 80 parts of the aforementioned urethane polythene and 20 parts of dicyclopentadiene acrylate is prepared and tested for abrasion resistance. The results of these tests are also reported in Table I.

TABLE I

| Example No. | Polythene Precursor(1) Monomer (wt %) | AH Monomer(2) Type | AH Monomer(2) Wt % | Crosslinking Monomer(3) Type | Crosslinking Monomer(3) Wt % | Photo-initiator (4), pph | Radiation Conditions(5) | Hardness(6) | Solvent Resistance (7) | Toughness in-lbs(8) | Adhesion(9) |
|---|---|---|---|---|---|---|---|---|---|---|---|
| 1 | EA/MMA/IEM (41/41/18) | HEA | 6 | TMPTA | 30 | 4.5 | 3 × 100w (30.5 MPM) 1 pass | H | >100 MEK | 10 | 90 |
| 2 | EA/MMA/IEM (44.5/44.5/11) | HPA | 4 | 0 | | 3 | 3 × 100w (30.5 MPM) 3 passes | HB | 24 MEK | 20 | 100 |
| 3A | S/BA/MMA/IEM (30/20/20/30) | HEA | 10.8 | HDDA | 20 | 3 | 3 × 100w (30.5 MPM) 1 pass | 2H | 70 MEK | 4 | 100 |
| 3B | S/BA/MMA/IEM (30/20/20/30) | " | " | DCPA | " | 3 | 3 × 100w (30.5 MPM) 5 passes | 2H | >100 MEK | 4 | 95 |
| 3C | S/BA/MMA/IEM | " | " | " | " | 4.5 | 3 × 100w (30.5 | 2H | >100 | 10 | 25 |

TABLE I-continued

| Example No. | Polythene Precursor(1) Monomer (wt %) | AH Monomer(2) Type | Wt % | Crosslinking Monomer(3) Type | Wt % | Photo-initiator (4), pph | Radiation Conditions(5) | Hardness(6) | Solvent Resistance (7) | Toughness in-lbs(8) | Adhesion(9) |
|---|---|---|---|---|---|---|---|---|---|---|---|
| | (30/20/20/30) | | | | | | MPM) 10 passes | | MEK | | |

(1)EA—ethyl acrylate, MMA—methyl methacrylate, IEM—2-isocyanatoethyl methacrylate, S—styrene, BA—butyl acrylate. Weight percentage indicates the weight percent of given monomer based on the polythene precursor.
(2)HEA—2-hydroxyethyl acrylate, HPA—2-hydroxypropyl acrylate. Weight percentage indicates the weight percent of the AH monomer based on the weight of the polythene precursor plus the weight of the AH monomer.
(3)TMPTA—trimethylol propane triacrylate, HDDA—hexanediol diacrylate, DCPA—dicyclopentadiene acrylate. Weight percentage indicates the weight percent of crosslinking monomer based on the total weight of the polythene precursor, AH monomer and crosslinking monomer.
(4)Parts of benzoin ether photoinitiator per hundred parts of polythene precursor, AH monomer and crosslinking monomer.
(5)Radition conditions indicated by light source (e.g., 3 × 100w = 3 lamps at 100 watts each), rate of sample travel under light source in meters/minute (MPM) and number of passes under the light source.
(6)Hardness measured by the pencil hardness test, the rating being the hardest pencil that does not scratch the coating surface.
(7)Solvent resistance measured by double rubs with a cotton swab soaked with methyl ethyl ketone.
(8)Toughness measured by a Gardner impact tester with the rating being the greatest number of inches a 1 lb weight can be dropped onto the reverse side of a coated panel (0.635 mm) without rupturing the coating.
(9)Adhesion is a crosshatch adhesion test wherein the coating is scored with a sharp instrument into 100 squares/square inch and then adhered to a pressure sensitive, glass reinforced adhesive tape. The tape is pulled quickly from the crosshatched section. Adhesion is determined by percent of squares remaining on the panel.

Film Testing

Using the cured coatings of Example No. 3B of the aforementioned Table I, the coating is tested for resistance to abrasion and staining. The results of these tests are reported in Table II.

TABLE II

| Example No. | Abrasion Resistance mg/100 Cycles(1) | Stain Resistance(2) | | |
|---|---|---|---|---|
| | | Mustard | Lipstick | Ink |
| 3B | 14.1 | None | None | None |

(1)Tabor Abrasion — determined by measuring weight loss of coating after 100 cycles with a CS-17 wheel and a 1000 g weight. A coating exhibiting a weight loss of less than 2 mg under such conditions has superior abrasion resistance. A loss of less than 15 mg/100 cycles indicates acceptable abrasion resistance.
(2)Lipstick — commercial type sold under trade name Moon Drops (#21 Honey Bee Pink) by Revlon. Ink — permanent ink (Marks-A-Lot ®) applied with broad tip applicator. The staining agent is applied to the coating, allowed to remain for 5 minutes and then wiped off with tissue paper soaked with ethanol. The amount of residual staining agent remaining after wiping with ethanol is observed.

What is claimed is:

1. A radiation curable coating formulation comprising
    (a) a polymer of 2-isocyanatoethyl methacrylate, the isocyanate moieties of which have been reacted with a hydroxyalkyl acrylate; and
    (b) a photoinitiator sufficient to initiate radiation cure of the formulation upon exposure to actinic radiation.
2. The formulation of claim 1 additionally comprising a polyethylenically unsaturated monomer copolymerizable with said polymer.
3. A method of making a radiation curable coating formulation comprising
    (a) addition polymerizing 2-isocyanatoethyl methacrylate to form a polymer;
    (b) reacting the polymer with 2-hydroxyethyl acrylate; and
    (c) adding to the reacted polymer a photoinitiator sufficient to initiate radiation cure of the formulation upon exposure to actinic radiation.
4. The method of claim 3 further comprising adding to the reacted but uncured polymer a polyethylenically unsaturated monomer copolymerizable with the reacted polymer.
5. The product of claim 3.
6. The product of claim 4.
7. The method of claim 3 wherein butyl acrylate, methyl methacrylate, styrene and/or ethyl acrylate are copolymerized with the 2-isocyanatoethyl methacrylate in step (a).
8. The product of claim 7.

* * * * *